Dec. 31, 1940.                H. A. WHEELER                2,226,648
                         PERIODIC WAVE GENERATOR
                           Filed Jan. 27, 1939
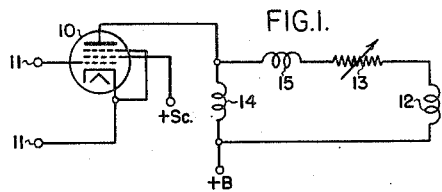
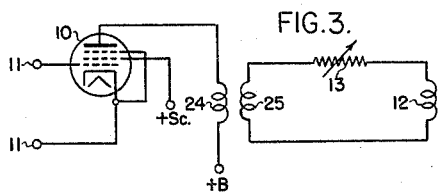
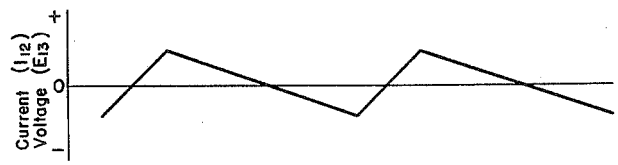
FIG.2a.
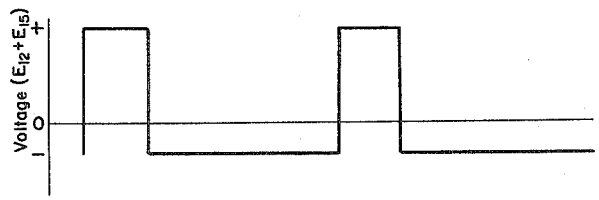
FIG.2b.
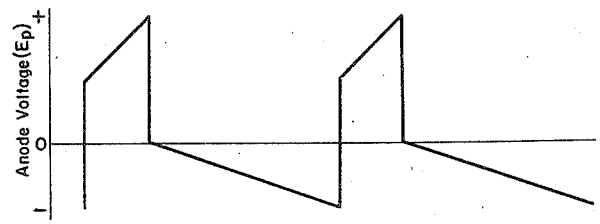
FIG.2c.
FIG.2d.
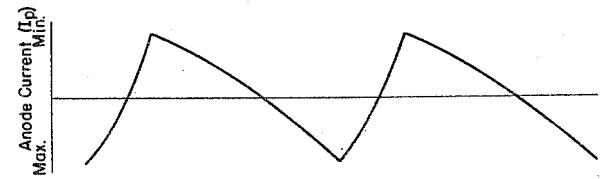
FIG.2e
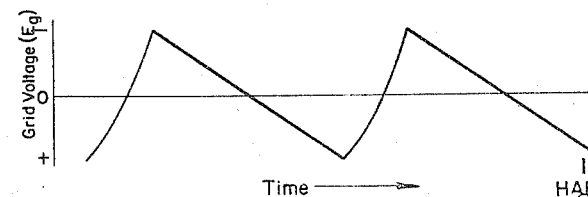
FIG.2f.
Time ——→
INVENTOR
HAROLD A. WHEELER
BY Laurence B. Odds
ATTORNEY Patented Dec. 31, 1940

2,226,648

UNITED STATES PATENT OFFICE 2,226,648

PERIODIC WAVE GENERATOR

Harold A. Wheeler, Great Neck, N. Y., assignor to Hazeltine Corporation, a corporation of Delaware Application January 27, 1939, Serial No. 253,034

5 Claims. (Cl. 250—36)

This invention relates to periodic wave generators or repeaters and, while of general application, the invention is of particular utility in producing electromagnetic scanning fields of saw-tooth wave form for television signal-translating apparatus.

In many electrical installations it is desirable to produce a periodic wave having a predetermined wave form. An example of the application of such a wave is in developing an electric field in the scanning system of a television signal-translating apparatus, such as a transmitter signal-generating tube or a receiver signal-reproducing tube. An electric field of the type under discussion is customarily produced by applying a periodic wave of a predetermined wave form to a vacuum tube having an output circuit in which is included a field-producing reactance element. A current or voltage of predetermined wave form is thus required from the tube in order to provide a scanning field of the desired wave form. Thus, to produce a saw-tooth current through an inductor to procure an electromagnetic scanning field, it is customary to apply periodic current pulses of substantially rectangular wave form to the input circuit of a vacuum-tube repeater. Integrating means comprising shunt capacitance is included in the input circuit to provide a saw-tooth voltage on the grid, thus to produce the desired saw-tooth current output. However, as a vacuum tube generally has an input voltage output current characteristic of appreciable curvature, the desired output wave form is not generally obtained.

Furthermore, in many systems of this general type, the output circuit of the vacuum tube is coupled to the field-producing inductance means through a separate inductor and, as the field-producing inductance means always comprises some inherent resistance, there results a closed series circuit coupled to the output electrodes of the tube effectively including the field-producing reactance means, the inherent resistance, and the coupling inductor. This condition exists if a step-down transformer is utilized to couple the output electrodes of the vacuum tube to the field-producing inductance means. However, under these conditions, a saw-tooth current through the field-producing inductance means and its inherent resistance can only be provided by a saw-tooth plus impulse voltage across the series combination which, in turn, requires a current through the coupling reactor which is curved over both the trace and retrace intervals of the wave. The output current required from the tube must, therefore, be of the same general wave form, that is, curved, over at least the trace interval where linear output of the generator is required. As a saw-tooth voltage having a linear characteristic over the trace interval is usually applied to the input electrodes of the tube, the required output conditions will not, in general, be met.

It is, therefore, an object of the invention to provide a periodic wave generator of the type under consideration which is not subject to the above-mentioned disadvantages of the arrangements of the prior art.

It is a further object of the invention to provide a periodic saw-tooth wave generator of the type mentioned above in which the distortion produced by the curved input voltage output current characteristic of the tube utilized is at least partially compensated.

It is still another object of the invention to provide a periodic wave generator of the type under consideration in which a saw-tooth voltage on the input circuit of the vacuum tube utilized produces a field whose wave form is substantially linear with time over the trace interval.

In accordance with the invention, a periodic wave generator for producing an output wave of predetermined saw-tooth wave form comprises a vacuum-tube repeater having input and output circuits. The vacuum tube has a nonlinear input voltage-output current characteristic over its operating range and means are provided for applying to the input circuit of the tube a periodic wave having the same period as the output wave and having a wave form related in a predetermined manner to the desired wave form. Inductance means are provided for utilizing the output wave, together with an inductor for coupling the output circuit to the inductance means. The generator further includes means for compensating for the effect of the nonlinear characteristic on the wave form of the output wave comprising resistance effectively in series in a closed circuit including the inductance means and the inductor. In accordance with a preferred embodiment of the invention, the generator produces an electromagnetic field of saw-tooth wave form having trace and retrace intervals and the resistance so provided is that which will produce optimum compensation, that is, the highest degree of linearity in the output wave form over the trace interval. Also in the preferred embodiment of the invention, a magnetic field of saw-tooth wave form having a relatively long trace and a relatively short retrace is produced, the circuit comprising a transformer for coupling the output circuit of the vacuum tube to the field-producing inductance means.

For a better understanding of the invention, together with other and further objects thereof, reference is had to the following description taken in connection with the accompanying drawing, and its scope will be pointed out in the appended claims.

Figs. 1 and 3 of the drawing are circuit diagrams of different embodiments of a periodic wave generator constructed and arranged in accordance with the invention for providing an electromagnetic field of saw-tooth wave form, while Figs. 2a–2f, inclusive, illustrate certain operating characteristics of the circuit of Fig. 1.

The tube 10 is selected to have a nonlinear input voltage-output current characteristic over its normal operating range of input voltages. The circuit of Fig. 1 is a circuit diagram of a periodic wave generator for producing a saw-tooth electromagnetic field having a relatively long trace interval and a relatively short retrace interval comprising a vacuum tube 10 having input terminals 11 and a field-producing inductance means 12. There is connected in series with inductance means 12 an adjustable resistor 13 which is comprised, at least in part, of the inherent resistance of the circuit. Inductance 12 is coupled to the output circuit of vacuum tube 10 by means of coupling inductor 14, the inductance 12, resistor 13, and inductor 14 being effectively in series in a closed circuit. Inductance 15 is shown in series with resistor 13 and inductance 12 for the reason that the circuit of Fig. 1 then includes a coupling circuit which is the equivalent of a transformer coupling between inductance 12 and the output circuit of vacuum tube 10.

In considering the operation of the circuit just described, the desired saw-tooth current $I_{12}$ through inductance means 12 is assumed as a starting point. In the following description subscripts corresponding to the reference numerals of the particular circuit elements under consideration are used to denote the current $I$ or voltage $E$ of the element. Fig. 2a thus illustrates the wave forms of the current $I_{12}$ through inductance means 12 and the resulting saw-tooth voltage $E_{13}$ across resistor 13. Fig. 2b shows the resulting pulse voltage $E_{12}+E_{15}$ in the same branch of the circuit while Fig. 2c illustrates the wave form of the sum of the voltages of Fig. 2a and Fig. 2b, which is the anode voltage $E_p$ of vacuum tube 10. The same voltage exists across the parallel coupling inductor 14 and the current in inductor 14 is obtained by integrating the voltage wave of Fig. 2c, yielding the parabolic saw-tooth current $I_{14}$ shown in Fig. 2d. The total anode current $I_p$ is the sum of the linear saw-tooth current $I_{12}$ and the parabolic saw-tooth current $I_{14}$ as shown in Fig. 2e. This total current can be obtained, as shown in Fig. 2f, by utilizing the curved or nonlinear input voltage output current characteristic of vacuum tube 10 and applying to the grid thereof a wave of the same period as the output wave and of a saw-tooth wave form, that is, a wave form related in a predetermined manner to the desired output wave.

Since linearity is required, in a television scanning system, only during the trace interval, that condition may be met in accordance with the invention by utilizing the following procedure. Referring to Fig. 2e, the direction of anode current is so plotted that the positive direction represents decreasing space current in the tube 10, the polarity of the saw-tooth current in the anode circuit then being that which can be obtained with maximum efficiency. The slope of the trace is less than average when the anode current is less than average, and vice versa, which corresponds with the normal input voltage output current characteristic of an amplifier tube. Therefore, the input voltage output current curvature of the tube can be employed to yield linear saw-tooth current in the deflecting coils during the trace interval where it would not otherwise be linear.

In order to derive expressions relating the amount of curvature to the amount of resistance required in series with field-producing inductance 12, the assumption is made that the amount of resistance and the amount of curvature are small. The average of the nonuniform slope of the saw-tooth current in the anode circuit of the tube is:

$$\frac{\Delta I_p}{(1-r)T} \qquad (1)$$

in which $\Delta I_p$ is the total change of current and $(1-r)T$ is the time of the trace. However, it is desired that the slope of the current $I_{12}$ through the deflecting coil be uniform during the trace period. Therefore, the desired variation of slope of the anode current $I_p$ is only that of the parabolic saw-tooth current $I_{14}$. It is caused by the variation of the voltage across inductor 14 during the trace period. The instantaneous slope of the current through inductor 14 is equal to the ratio of the instantaneous voltage to the value of its inductance. Therefore, the total change of slope of the current $I_{14}$ is equal to the total change of voltage during the trace period divided by the inductance of inductor 14. The change of voltage is:

$$R_{13}\Delta I_{12} = R_{13}\Delta I_p \frac{L_{14}}{L_{12}+L_{15}+L_{14}} \qquad (2)$$

The last factor is the ratio of the current change $\Delta I_{12}$ through inductance means 12 to the total change of current $\Delta I_p$. This change of voltage divided by the value of inductance of inductor 14 gives the change of slope of the current $I_{14}$ and, therefore, of the total current $I_p$:

$$\frac{R_{13}\Delta I_p}{L_{12}+L_{15}+L_{14}} \qquad (3)$$

It is useful to define the time constant of the transformer secondary circuit as:

$$T_s = \frac{L_{12}+L_{15}+L_{14}}{R_{13}} \qquad (4)$$

The relative change of slope is then equal to the total change of slope divided by the average slope as given by the following expression:

$$\frac{\dfrac{R_{13}\Delta I_p}{L_{12}+L_{15}+L_{14}}}{\dfrac{\Delta I_p}{(1-r)T}} = \frac{(1-r)T}{T_s} \qquad (5)$$

It is the ratio of the trace interval to the time constant of the secondary circuit. This is the relative change of slope desired in the grid voltage anode current characteristic of the tube.

If the time constant of the transformer secondary circuit is comparable with the trace time, or greater, the required curvature of the tube characteristic can reasonably be obtained in practice without critical adjustment. If an adjustment is desired for the cancellation of the two opposing causes of distortion, that is, the curvature of the input voltage output current characteristic of tube 10 and the curvature produced by resistance 13, it may be made by changing either the curvature of the tube characteristic or the value of resistor $R_{13}$. It is convenient to adjust the value of resistor 13 because it has little effect on the amplitude of the saw-tooth current in the field-producing inductance means 12. However, the curvature of the tube characteristic may be adjusted, for example, by a variation of resistance inserted in its cathode lead. This correction can be used in combination with other types of correction such as compensation for the effect of impedance elements by the introduction of impedance elements having a complementary effect as illustrated in applicant's copending application, Serial No. 238,757, filed November 4, 1938. The means just described for correcting the nonlinearity of the trace portion of the saw-tooth wave at the same time accentuates the nonlinearity of the retrace portion; however, in the application described, the nonlinearity of the retrace portion is of no significance.

The circuit of Fig. 3 is essentially similar to that of Fig. 1 and corresponding circuit elements are given identical reference numerals. The circuit of Fig. 3 differs from that of Fig. 1 only in that inductors 14 and 15 are replaced by a transformer comprising a primary inductance 24 inductively coupled to a secondary inductance 25. The operation of the circuit of Fig. 3 is similar to that of Fig. 1, rendering a further description thereof unnecessary.

As illustrative of a particular embodiment of the invention, the following circuit constants are given and are applicable to the circuit of Fig. 1:

$$r = .15$$

$$T = 75 \text{ microseconds}$$

$$L_{12} + L_{14} + L_{15} = 5 \text{ microhenries}$$

If the relative curvature of the characteristic of tube 10, for which correction is to be made, is $\frac{1}{10}$; that is, its slope varies from the average by $\pm \frac{1}{20}$ over the range under consideration, the value of $T_s$ is obtained by substitution in Equation 5, $\frac{1}{10}$ being substituted for the left-hand member of the equation.

$$T_s = 640 \text{ microseconds}$$

From Equation 4, $$R_{13} = 8 \text{ ohms}$$

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A periodic wave generator for producing an output wave of predetermined saw-tooth wave form comprising, a vacuum-tube repeater having input and output circuits, said vacuum tube having a nonlinear input voltage output current characteristic over its operating range, means for applying to said input circuit a periodic wave having the same period as said output wave and having a wave form related in a predetermined manner to the desired wave form, inductance means for utilizing said output wave, an inductor for coupling said output circuit to said inductance means, and means for compensating for the effect of said nonlinear characteristic on a portion of the wave form of said output wave comprising resistance effectively in series in a closed circuit including said inductance means and said inductor.

2. A periodic wave generator for producing an electromagnetic field of saw-tooth wave form having trace and retrace intervals comprising, a vacuum-tube repeater having input and output circuits, said vacuum tube having a nonlinear input voltage output current characteristic over its operating range, means for applying to said input circuit a periodic wave having the same period as said field and having a wave form related in a predetermined manner to the wave form of the field, inductance means for producing said field, an inductor for coupling said output circuit to said inductance means, and means for compensating for the effect of said nonlinear characteristic on the wave form of said field during one of said intervals comprising resistance effectively in series in a closed path including said inductance means and said inductor.

3. A periodic wave generator for producing an electromagnetic field of saw-tooth wave form having a relatively long trace and a relatively short retrace interval comprising, a vacuum-tube repeater having input and output circuits, said vacuum tube having a nonlinear input voltage output current characteristic over its operating range, means for applying to said input circuit a periodic wave having the same period as said field and having a wave form related in a predetermined manner to that of said field, inductance means for producing said field, an inductor for coupling said output circuit to said inductance means, and means for compensating for the effect of said nonlinear characteristic on the wave form of said field during said trace interval comprising resistance effectively in series in a closed circuit with said inductance means and said inductor.

4. A periodic wave generator for producing an electromagnetic field of saw-tooth wave form having a relatively long trace and a relatively short retrace intervals comprising, a vacuum-tube repeater having input and output circuits, said vacuum tube having a nonlinear input voltage output current characteristic over its operating range, means for applying to said input circuit saw-tooth voltage pulses having the same period as said field, inductance means for producing said field, an inductor for coupling said output circuit to said inductance means, and means for compensating for the effect of said nonlinear characteristic on the wave form of said field during one of said intervals comprising resistance effectively in series in a closed path including said inductance means and said inductor.

5. A periodic wave generator for producing an electromagnetic field of saw-tooth wave form having trace and retrace intervals comprising a vacuum-tube repeater having input and output circuits, said vacuum tube having a nonlinear input voltage output current characteristic over its operating range, means for applying to said input circuit a periodic wave having the same period as said output wave and having a wave form related in a predetermined manner to the desired wave form, inductance means for producing said field, a transformer comprising primary and secondary inductors for coupling said output circuit to said inductance means, and means for compensating for the effect of said nonlinear characteristic on the wave form of said field during at least one of said intervals comprising resistance effectively in series in a closed circuit including said inductance means and said secondary inductor.

HAROLD A. WHEELER.